United States Patent
St. Pierre

(10) Patent No.: US 10,462,179 B2
(45) Date of Patent: Oct. 29, 2019

(54) SYSTEM AND METHOD FOR SCALED MANAGEMENT OF THREAT DATA

(71) Applicant: Arbor Networks, Inc., Burlington, MA (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 263 days.

(21) Appl. No.: 15/342,770

(22) Filed: Nov. 3, 2016

(65) Prior Publication Data
US 2018/0124099 A1    May 3, 2018

(51) Int. Cl.
H04L 29/06     (2006.01)
H04L 12/26     (2006.01)

(52) U.S. Cl.
CPC .......... H04L 63/1441 (2013.01); H04L 63/20 (2013.01); *H04L 43/026* (2013.01); *H04L 43/0876* (2013.01); *H04L 63/101* (2013.01); *H04L 2463/142* (2013.01); *H04L 2463/144* (2013.01)

(58) Field of Classification Search
CPC ... H04L 63/1441; H04L 63/20; H04L 63/101; H04L 43/0876; H04L 43/026; H04L 2463/144; H04L 2463/142
See application file for complete search history.

(56) References Cited

U.S. PATENT DOCUMENTS

| 9,282,116 | B1 * | 3/2016 | Rovniaguin | H04L 63/1458 |
| 2004/0047356 | A1 * | 3/2004 | Bauer | H04L 63/1416 370/401 |
| 2007/0157306 | A1 * | 7/2007 | Elrod | H04L 63/0227 726/14 |
| 2007/0169194 | A1 * | 7/2007 | Church | G06F 21/552 726/23 |

(Continued)

*Primary Examiner* — Khoi V Le
(74) *Attorney, Agent, or Firm* — Locke Lord LLP; Scott D. Wofsy; Christopher J. Capelli

(57) ABSTRACT

A method, system, and computer-implemented method to manage threats to a network is provided. The method includes receiving volume threat data that indicates a volume of threat data that needs to be managed by a threat management system having a plurality of threat management devices, determining a volume range from a plurality of volume ranges to which the received volume threat data belongs, determining a number of threat management devices of the plurality of threat devices needed to manage threat traffic associated with the volume range determined, and determining whether the number of threat management devices needed is different than a number of threat management devices currently being used to manage threat traffic. The method further includes selecting automatically threat management devices of the plurality of threat management devices to manage received threat data, in response to a determination that the number is different and based on the number determined, assigning automatically, each packet of the threat traffic to a group, each group corresponding to a threat management device of the selected threat manage- (Continued)

ment devices, and directing automatically each packet of the threat traffic to the threat management device that corresponds to the group to which the packet is assigned.

17 Claims, 5 Drawing Sheets

(56) References Cited

U.S. PATENT DOCUMENTS

| | | | |
|---|---|---|---|
| 2010/0100963 A1* | 4/2010 | Mahaffey | G06F 21/564 |
| | | | 726/25 |
| 2011/0185424 A1* | 7/2011 | Sallam | G06F 21/566 |
| | | | 726/23 |
| 2013/0067571 A1* | 3/2013 | Lee | H04L 41/0681 |
| | | | 726/22 |
| 2015/0067866 A1* | 3/2015 | Ibatullin | G06F 21/554 |
| | | | 726/25 |
| 2016/0261621 A1* | 9/2016 | Srivastava | H04L 63/1425 |

\* cited by examiner

SYSTEM AND METHOD FOR SCALED MANAGEMENT OF THREAT DATA

FIELD OF THE INVENTION

The disclosed embodiments generally relate to computer network protection, and more particularly, a system and method for scaled management of threat data.

BACKGROUND OF THE INVENTION

Networks are constantly exposed to security exploits that are of significant concern to network providers. For example, Denial of Service ("DoS") attacks can cause significant damage to networks and networked devices. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks).

Other network security threats include Trojan horse attacks that may be embedded in harmless software, viruses that can reproduce themselves and attach to executable files, worms that can spread via stored collections of e-mail addresses, and logic bombs that can remain dormant until triggered by an event (e.g., a date, user action, random trigger, etc.).

One or more threat management devices can be provided to manage threat traffic associated with network attacks, such as by applying countermeasures to thwart such attacks. However, the volume of threat traffic can fluctuate. At times, threat traffic can be minimal, during which the threat management device(s) may use a small amount of processing resources to manage the threat traffic. However, when a major attack is detected that generates a large amount of threat traffic, the threat management device(s) need a large amount of processing resources to handle its tasks. The threat management device(s) have a finite capacity. When the threat management device(s)' capacity is surpassed, the threat management device(s) can drop arbitrary traffic without analysis, such that legitimate traffic can be dropped along with attack traffic, thus allowing the attack to succeed.

Such conventional methods and systems have generally been considered satisfactory for their intended purpose. However, there is still a need in the art for scaling management of threat traffic so that processing resources are available when a large amount of processing resources are needed to manage threat traffic during major attack, but the processing resources are not tied up when a major attack is not underway and less threat traffic management is needed. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for managing threats to a network. In aspects of the disclosure, a computer system and computer-readable medium are provided that implement the method. The method includes receiving volume threat data that indicates a volume of threat data that needs to be managed by a threat management system having a plurality of threat management devices, determining a volume range from a plurality of volume ranges to which the received volume threat data belongs, determining a number of threat management devices of the plurality of threat devices needed to manage threat traffic associated with the volume range determined, and determining whether the number of threat management devices needed is different than a number of threat management devices currently being used to manage threat traffic. The method further includes selecting automatically threat management devices of the plurality of threat management devices to manage received threat data, in response to a determination that the number is different and based on the number determined, assigning automatically, each packet of the threat traffic to a group, each group corresponding to a threat management device of the selected threat management devices, and directing automatically each packet of the threat traffic to the threat management device that corresponds to the group to which the packet is assigned.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
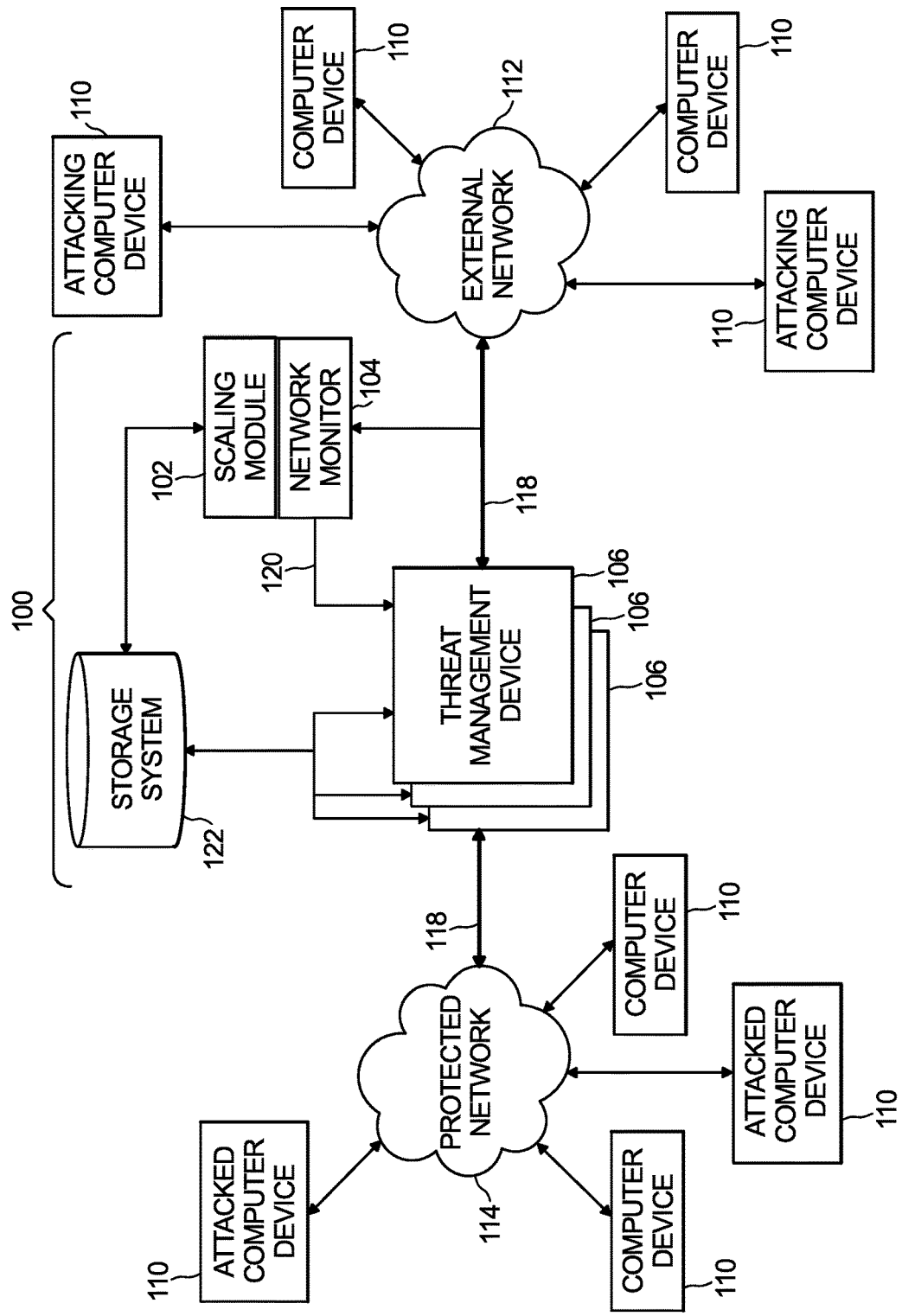
FIG. 1 illustrates a block diagram of an example network protection system operating with one or more communication networks in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network protection system in accordance with the disclosure is shown in FIG. 1 and is designated generally by reference character 100. Other embodiments of the network protection system 100 in accordance with the disclosure, or aspects thereof, are provided in FIGS. 2 and 3, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network protection system 100 is provided that monitors network traffic to and from a protected network 112 and applies mitigation countermeasures to detected threat traffic in order to mitigate a network attack that effects the protected network 114 or computer devices 110 using the protected network 114.

The network protection system 100 includes a threat management (TM) scaling module 102 that automatically assigns threat traffic detected by a network monitor 104 to a number of threat management devices (TMDs) 106, wherein the number of TMDs 106 that are enabled to manage the total traffic is adjusted based on the volume of threat traffic. The network monitor 104 monitors network traffic, which can be transmitted via one or more communication links 118 to or from the protected network 114 and/or to or from computing devices 110 communicating internally within the protected network 114. Network traffic 118 that is communicated between the protected network 114 and the external network 112 can include threat traffic, such as may be sent by an attacking computer device 110.

The scaling module 102 is alerted about the attacks by the network monitor 104, upon which the scaling module 102 assigns a portion of the total traffic to each of the enabled TMDs 106 for management. The management can include traffic mitigation, including, for example, blocking attack traffic, forwarding legitimate traffic, or blocking attack traffic and blacklisting the source IP address. Blocked attack traffic is not output from the TMD 106 as network traffic for transmission to its intended destination as indicated by the attack traffic. When the IP source address is blacklisted, future traffic from the same source IP address will be blocked. Forwarded attack traffic is output from the TMD 106 as network traffic for transmission to its intended destination as indicated by the attack traffic.

Each TMD 106 has a fixed capacity for mitigating traffic. When the volume of traffic increases, the capacity of a single TMD 106 can be exceeded. When the capacity of a TMD is exceeded the TMD can arbitrarily fail to analyze or forward traffic, during which legitimate traffic can be dropped along with threat traffic. Accordingly, the scaling module 102 can automatically distribute traffic across multiple TMDs 106 to avoid exceeding the capacity of any of the TMDs, including adjusting the number of TMDs 106 that are enabled to manage the traffic. The adjustment of the number of TMDs 106 that are enabled to manage the traffic is transparent to the computing devices 110, protected network 114, and external network 112.

Additionally, statistics about threat management performed by the TMDs 106, even as the number of TMDs 106 that are enabled and being used increases or decreases, are combined together and displayed to a user of the network protection system 100 as a single graphical display. The adjustment of the number of enabled TMDs 106 can thus be transparent to the user. The scaling module 102 can combine the statistics received from enabled TMDs 106 and generate a graphical user interface (GUI) that provides a display of the combined statistics so that the statistics appear as if they were provided by a single source, e.g., TMD 106.

The scaling module 102 communicates with the TMDs 106, e.g., via out-of-band communication, to enable, configure, and/or disable selected TMDs 106 and receive statistics. The out-of-band communication can be implemented using out-of-band communication links 120 that may use an out-of-band network or channel.

Each time a TMD 106 is enabled, the scaling module 102 shares a management state, including a plurality of state parameters, of TMDs 106 that are already managing the threat data with the TMD 106 that is being newly enabled. The scaling module 102 can store and update in a storage system 122 state parameters and statistics associated with TMDs 106 enabled for threat data management. The stored state parameters can be used to update the state parameters of a newly enabled TMD 106, and the stored statistics associated with each TMD 106 that is enabled for threat data management can be combined to create a unified display.

The scaling module 102 and the network monitor 104 can be integrated in a single device or share one or more hardware or software components. Additionally, the scaling module 102 and the network monitor 104 can be implemented as physical or virtual devices. Whether implemented as a physical or virtual device, the scaling module 102 uses a hardware processing device that executes software instructions, which enables performance of the disclosed functions.

The scaling module 102, whether configured in combination or separate from the network monitor 104, includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also store analyzing criteria for detecting threat traffic from among the network traffic.

In embodiments, at least portions of the network protection system 100 are located between the external network 112 and the protected network 114. In other embodiments, at least portions of the network protection system 100 are located within the external network 112 or protected network 114. At least portions of the network protection system 100 can be located at a network edge (inside or outside of the protected network 114) or deeper within the protected network 114.

The network monitor 104 includes hardware, firmware, and/or software components that are configured to measure traffic volume into the protected network 112 (e.g., as a rate of flow or a quantity). Network monitor 104 can include central or distributed elements for intercepting and/or analyzing network data. These elements can be passive or active and include software, firmware, and/or hardware components, such as taps, probes, or port mirrors. These elements can be positioned inline, and/or remote relative to communication links 118.

The TMDs 106 can be implemented using hardware, software, firmware, or a combination thereof. In embodiments, TMDs 106 can each be implemented using different physical devices. In embodiments, or one or more of the TMDs 106 can share one or more software, hardware, or firmware components.

Computer devices 110 can be devices such as servers, laptop devices, network elements such as routers, switches, and firewalls, embedded computer devices that are embedded in other devices, such as appliances, tools, vehicles, or consumer electronics, mobile devices, such as laptops, smartphones, cell phones, and tablets.

The protected network 114 and external network 112 support communication between computer devices 110 included in the respective network that have access to and authority to use the corresponding network. The networks 112 and 114 can include one or more networks, such as an intranet, a local area network (LAN), and/or a wide area network (WAN). In examples, the protected network 114 can be an enterprise network, such as a school network, business network, and government network, to list a few examples, that can connect to the Internet. The external network 112 can include further include the Internet, which it may use to access the protected network 114.

In an example, threat traffic associated with an attack can emanate from a computing device 110 using the external network 112 and be directed at a computing device 110 using the protected network 114. Depending on the type of attack, the network attack can be instigated and carried on by one or more attacking computer devices 110. These attacking computer devices 110 can work independently from one another or be coordinated, such as in a botnet. For example, some of the attacking computer devices 110 can be zombies. The attacks can target specific or random attacked computing devices 110. An attacked computer device 110 using the protected network 114 can be converted into an attacking computer device 110. Such an attacking computer can continue to operate legitimately and transmit both threat traffic and legitimate traffic. Accordingly, the network protection system 100 can monitor traffic directed to (inbound) or from (outbound) the protected network 114 and mitigate threat traffic in either direction.

The attack can involve a variety of unwanted network behavior, such as eavesdropping, data modification, identity spoofing, password-based or compromised-key attacks, denial-of-service attacks, man-in-the-middle attacks, sniffer attacks, and application-layer attacks. The attack can be distributed, such as in a Distributed Denial of Service ("DDoS") attack.

Figure 2:
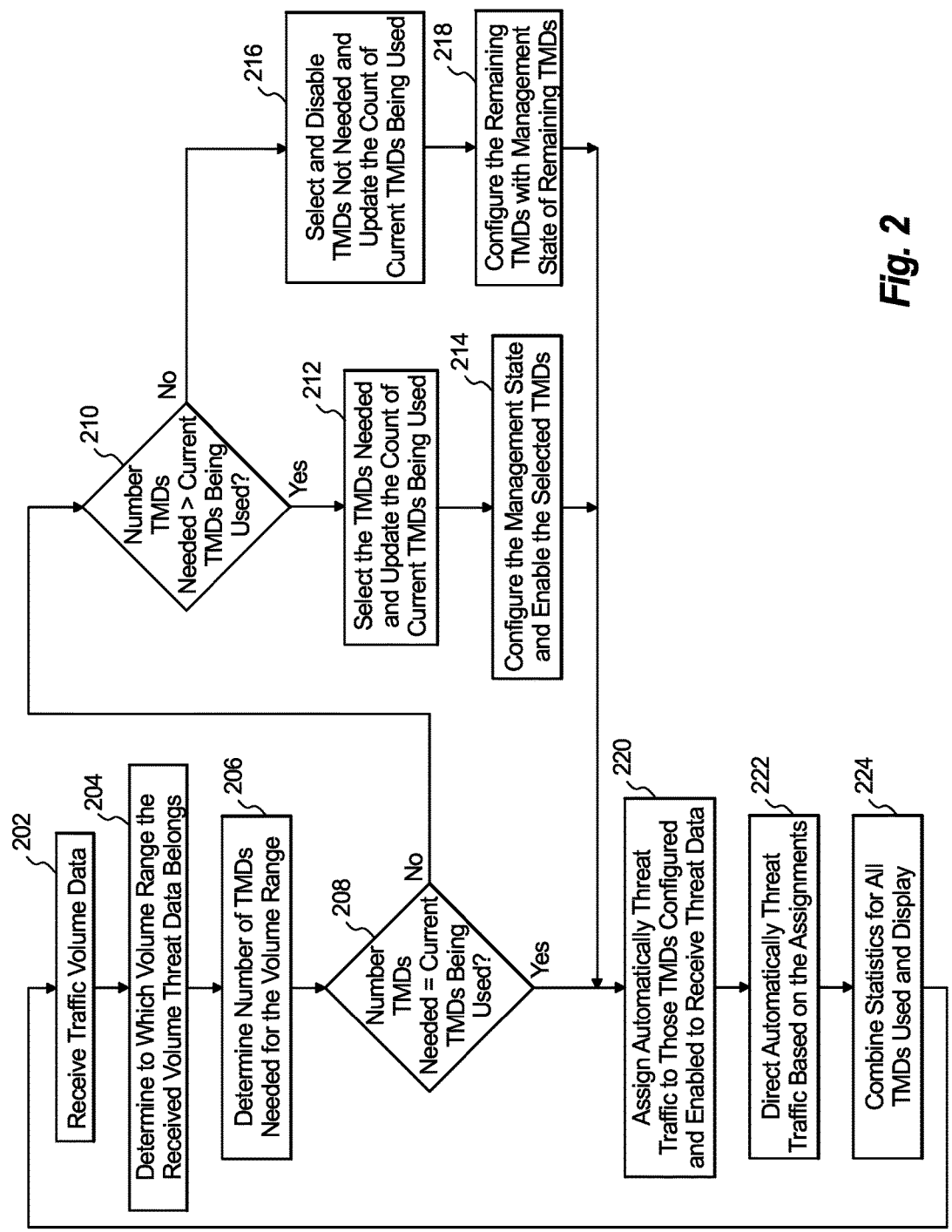
FIG. 2 is an example flowchart showing a method performed by a scaling module of the network protection system shown in FIG. 1.
Figure 3:
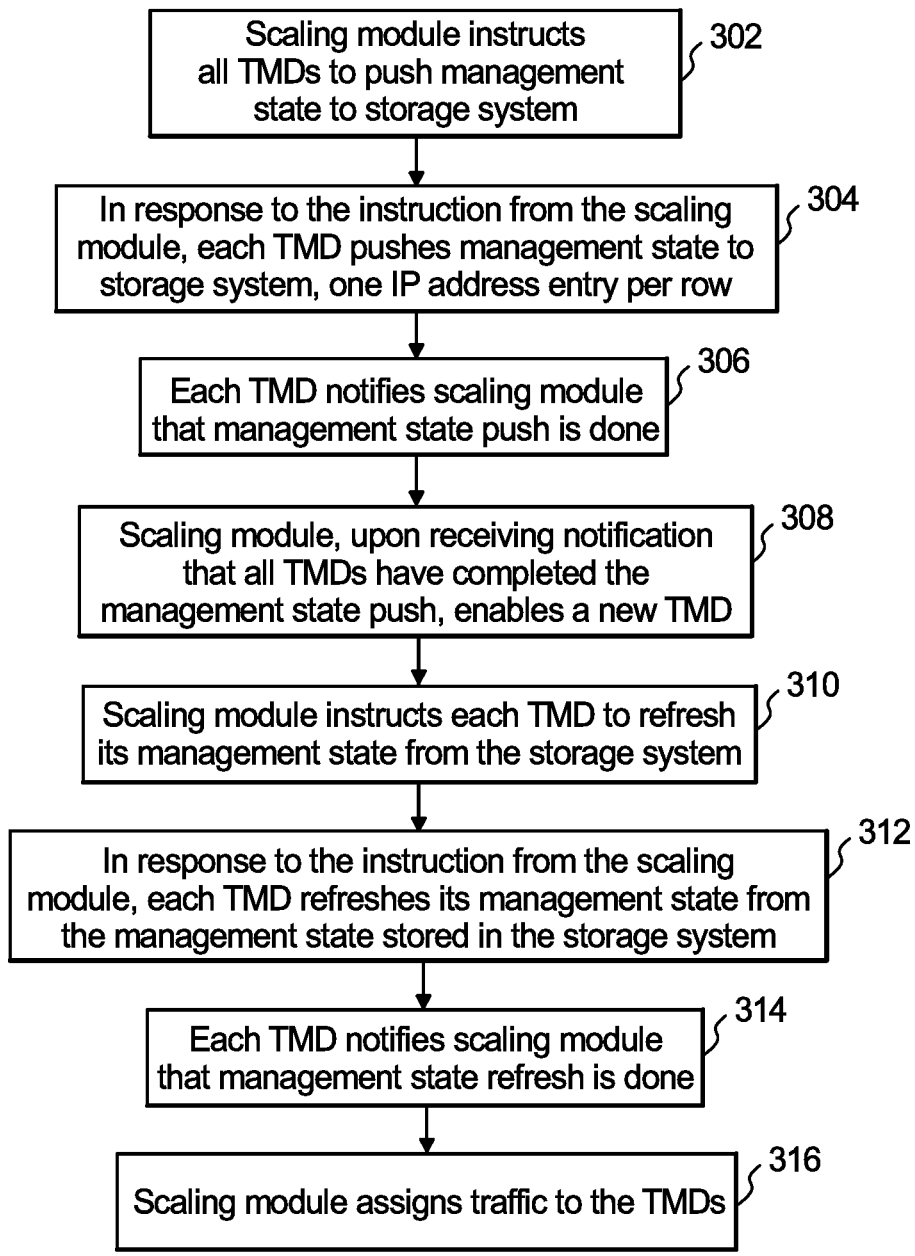
FIG. 3 is an example flowchart showing a method to enable a threat management device of a threat management system included in a network protection system.
Figure 4:
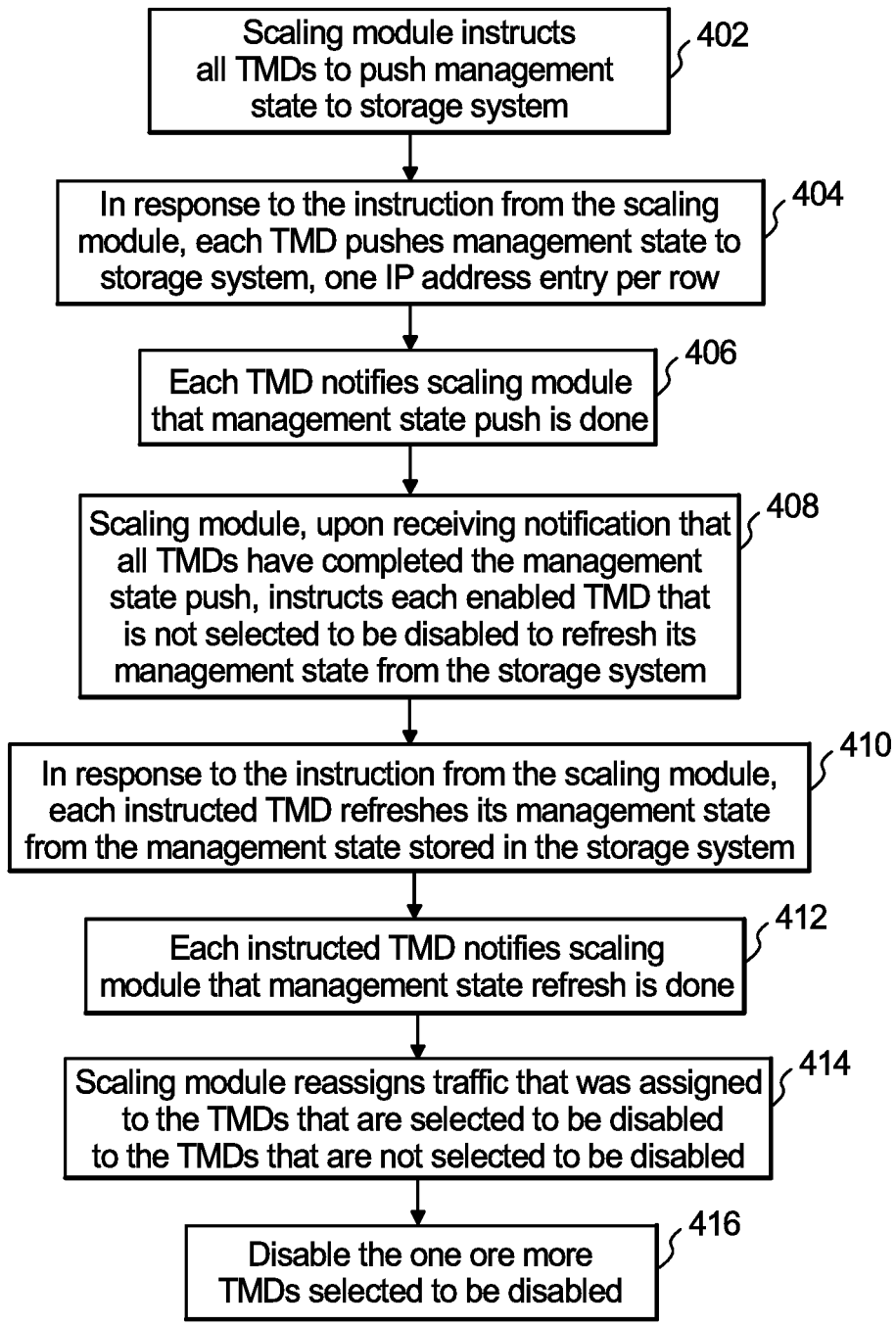
FIG. 4 is an example flowchart showing a method to disable a threat management device of a threat management system included in a network protection system.

With reference now to FIGS. 2-4, shown are flowcharts demonstrating implementation of the various exemplary embodiments. It is noted that the order of operations shown in FIGS. 2-4 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of operations performed by a scaling module, such as scaling module 102 shown in FIG. 1. At operation 202 traffic volume data is received, wherein the traffic volume data indicates a total volume of traffic that needs to be managed by one or more TMDs, such as TMDs 106 shown in FIG. 1. The traffic volume data can be received from a central traffic volume measurement component or distributed traffic volume measurement components of a network monitor, such as network monitor 104 shown in FIG. 1. As submitted above, the network monitor can detect traffic and measure the volume of the detected traffic, such as by determining a rate of flow of traffic, using a central component or multiple distributed components. The scaling module can sum volume threat data received from multiple components of the network monitor in order to determine a total volume of threat data.

At operation 204, a volume range of at least two different volume ranges to which the received traffic volume data belongs is determined. For example, the scaling module can access a lookup table (LUT) stored in a storage system, such as storage system 122 shown in FIG. 1, wherein the LUT includes entries for the at least two volume ranges. The scaling module can also query available TMDs, such as TMDs 106 shown in FIG. 1, for their respective capacities, which may not be uniform, and use this to determine volume ranges.

At operation 206, a number of TMDs that would be needed to manage traffic associated with the determined volume range is determined. The number of TMDs can be determined, for example, by consulting the LUT, wherein the LUT further indicates an associated number of TMDs needed for each volume range. The LUT can be configured to indicate as few TMDs as possible for each volume range. The number of TMDs can be selected to cause each TMD to operate near its maximum capacity, but without exceeding its maximum capacity. This can also be achieved when the capacities of all available TMDs are known to the scaling module, based upon which the scaling module can select one or more specific TMDs to manage the traffic.

At operation 208, a determination is made whether the number of TMDs determined as being needed at operation 206 is different than a number of TMDs currently enabled and being used to manage threat traffic. For example, the number of TMDs that are enabled and are currently being used can be a stored value that was stored during a previous iteration. For the first iteration, the number of TMDs currently being used can be set to a default value, such as zero.

At operation 210, in response to the determination at operation 208 being YES, meaning that the number is different, a determination is made whether the number of TMDs needed is more than the number of TMDs currently being used.

If the determination at operation 210 is YES, meaning that the number of TMDs needed is more than the number of TMDs currently being used, then at operations 212 and 214, additional TMDs are enabled.

At operation 212, one or more additional TMDs are selected to be enabled to manage threat traffic based on the number of TMDs needed. Furthermore, at operation 212, the number of TMDs currently being used is updated to include the one or more selected TMD(s). At operation 214, the selected TMD(s) are configured and enabled to manage threat traffic directed to them.

The TMD(s) may be selected based on, for example and without limitation, raw TMD capacity, e.g., as measured by bits per second or packets per second, TMD power consumption, network load along the path to the TMDs, or other criteria. In embodiments, selecting the TMDs can include, for example, efficiency balancing threat traffic and/or threat management tasks that are performed by the plurality of TMDs. For example, the TMDs may be used by other processing systems, and selecting the TMD to use can include selecting a TMD that is already in use, but has capacity, in order to use as few TMDs as possible. Since only a portion of the TMD is being used in this scenario, the number of TMDs currently being used is updated based on the portion of the TMD that is being used. Efficiency balancing can include selecting the TMDs based on characteristics of the threat traffic or suitability of the TMDs for performing TMD tasks. The characteristics of the threat data can be indicated by the network monitor. As described in greater detail with respect to FIG. 4, configuring the selected TMDs can include copying state parameters of each of the TMDs currently being used to manage the threat traffic to the selected TMDs. This step can include updating each of the TMDs being used so that all of the TMDs have the same updated state parameters.

The state parameters associated with each of the TMDs currently being used can include at least one of a blacklist used by the TMD for managing the threat traffic, a whitelist used by the TMD for managing the threat traffic, authentication data used by the TMD to authenticate the threat traffic, and statistics about the threat management performed by the TMD.

If the determination at operation 210 is NO, meaning that the number of TMDs needed is less than the number of TMDs currently being used, then at operations 216 and 218, at least one or more TMDs are disabled.

At operation 216, one or more TMDs that are enabled and currently being used to manage the threat traffic are selected to be disabled, and are disabled. The selection of which TMD(s) to disable can be based on, for example and without limitation, raw TMD capacity, such as measured by bits per second or packets per second, TMD power consumption, and/or network load along the path to the TMD(s). Furthermore, at operation 216, the number of TMDs currently being used is updated to reflect the one or more TMDs that are selected to be disabled are then disabled.

As described in greater detail with respect to FIG. 4, at operation 218, the remaining TMDs that are still managing the threat data and were not disabled are reconfigured by sharing the management state of the disabled TMDs with the remaining TMDs.

Sharing the management state of the disabled TMDs with the remaining TMDs can include copying state parameters of the TMDs that are selected to be disabled, and storing the copied state parameters with the remaining TMDs. Each TMD sends its collection of state parameters to the storage system in one or more messages using an in-band or preferably out-of-band management network. The collection of state parameters may include any or all of: device configuration, a network access control list, a blacklist, a whitelist, a list of authentications/challenges in progress, per-host and overall traffic statistics, blacklist/access control list (ACL) state that may have been offloaded to an upstream device, token bucket size and usage state, per-host "repeat offender" status, timing offset and/or jitter of the TMD from a shared network clock, timing information associated with entries in any or all of the aforementioned lists, and any other list or collection of host, address, timing or other information used by a TMD to decide whether to pass or drop a particular network packet.

If the determination at operation 208 is NO, meaning that the number of TMDs needed to accommodate the volume range is not different than the number of TMDs currently being used, the method continues at operation 220.

At operation 220, each packet of the threat traffic is automatically assigned to a group, wherein each group corresponds to a respective TMD of the TMDs configured and enabled to receive threat data. At operation 222, each packet of the threat traffic is automatically directed to the TMD that corresponds to the group to which the packet is assigned.

The assignment of packets at operation 220 can be based on a characteristic of the threat data. For example, the packets can be assigned using rules that assign packets to a group based on a destination address prefix included in the packet, such as by using a network protocol (e.g. BGP—Border Gateway Protocol). When an additional TMD2 has been added to a currently operating TMD1, an initial example rule: "send all traffic destined for network A.B.C.D to TMD1", can be replaced with two rules: "send all traffic for A.B.C.Y to TMD1" and "send all traffic for A.B.C.Z to TMD2". Other characteristics of the threat traffic that could be used to assign the threat traffic to different groups include source address, protocol, port number, etc.

At operation 224, statistics are received, wherein the statistics include at least one statistical element associated with threat management performed by each of the TMDs that are used to perform threat management. Each of the TMDs being used can generate statistics about the threat management it performs and transmit these statistics to the mitigating scaling module 102. Each statistical element is combined across all of the TMDs used to perform threat management, meaning values are summed that correspond to the same statistical element received from the TMDs that are enabled to perform threat management. The summed value is an overall statistic element for the TMDs. A display is generated of the combined statistical elements (e.g., the overall statistic elements). The display of each combined statistical element is displayed as an overall statistic element for the TMDs, appearing as if the statistic element is associated with a single TMD.

With reference to FIG. 3, a flowchart is shown of detailed operations performed at operation 214 shown in FIG. 2 by the scaling module and the TMDs once an additional TMD has been selected at operation 212 to manage the threat traffic. Accordingly, the flowchart of FIG. 3 indicates operations performed when the selected TMDs are being configured and enabled to manage threat traffic directed to them.

At operation 302, the scaling module instructs all of the currently enabled TMDs to push their management state to the storage system, meaning all of the enabled TMDs update a central state data structure stored in the storage system, such as storage system 122 shown in FIG. 1. In an example, the central state data structure is a single table that stores a single centralized management state for all of the enabled TMDs. The data structure can include, for example, a row associated with each state parameter, however, the disclosure is not limited to a particular type of a data structure. For example, each IP address that is blacklisted or whitelisted can be stored in a respective row. In another example, an RDBMS with separate tables for blacklist, whitelist, etc., may be used. In another example, different distributed data structures may be used for each state collection as suitable for the size, make-up, and access pattern of each collection type. For example, a distributed trie may be used for sharing in-progress authentications while a distributed hash table is used for sharing the blacklist.

At operation 304, in response to the instruction from the scaling module, each enabled TMD pushes its management state to the storage system, e.g., by storing its management state in the central state data structure, e.g., one IP address entry per row. Since the traffic is partitioned amongst the enabled TMDs, no two enabled TMDs will have management state data (e.g., a blacklist or whitelist entry) for the same source IP address. Accordingly, there should not be conflicting data stored in different rows of the central state data structure. At operation 306, each enabled TMD notifies the scaling module that it has completed storing its management state in the central state data structure.

At operation 308, the scaling module, upon receiving notification that all enabled TMDs have completed storing their management state in the central state data structure, enables a new TMD that was selected at operation 212, At operation 310, the scaling module instructs each enabled TMD, including the newly enabled TMD, to refresh its management state from the storage system, e.g., by replacing its state parameters with the state parameters stored in the central state data structure. At operation 312, in response to the instruction from the scaling module, each enabled TMD refreshes its state from the state parameters stored in the storage system. At operation 314, each enabled TMD notifies the scaling module that it has completed refreshing its management state. At operation 316, the scaling module assigns traffic to the enabled TMDs.

With reference to FIG. 4, a flowchart is shown of detailed operations performed at operation 218 shown in FIG. 2 by the scaling module and the TMDs once a TMD has been selected to be disabled at operation 216 from managing the threat traffic. Accordingly, the flowchart of FIG. 3, indicates operations performed when configuring the TMDs once a TMD has been selected to be disabled.

At operation 402, the scaling module instructs all of the currently enabled TMDs to push their management state to the storage system, meaning all of the enabled TMDs update the central state data structure stored in the storage system. At operation 404, in response to the instruction from the scaling module, each enabled TMD pushes its management state to the storage system, e.g., by storing its management state in the central state data structure, e.g., one state parameter per row. At operation 406, each enabled TMD notifies the scaling module that it has completed storing its management state in the central state data structure.

At operation 408, the scaling module, upon receiving notification that all enabled TMDs have completed storing their management state in the central state data structure, instructs each enabled TMD that is not selected to be disabled to refresh its management state from the storage system, e.g., by replacing its state parameters with the state parameters stored in the central state data structure. At operation 410, in response to the instruction from the scaling module, each instructed TMD (i.e., that is enabled but not selected to be disabled) refreshes its state from the state parameters stored in the storage system. At operation 412, each instructed TMD notifies the scaling module that it has completed refreshing its management state. At operation 414, the scaling module reassigns traffic, that until now was assigned to the TMDs that are selected to be disabled, to the TMDs that are not selected to be disabled. At operation 416, the scaling module disables the TMD(s) that were selected at operation 216.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the scaling module 102 or TMDs 106 may be implemented or executed by one or more computer systems. For example, scaling module 102 and TMDs 106 can be implemented using a computer system such as example computer system 502 illustrated in FIG. 5. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system-executable instructions, such as program modules, being executed by a computer system. Generally, program modules may include routines, programs, objects, components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Figure 5:
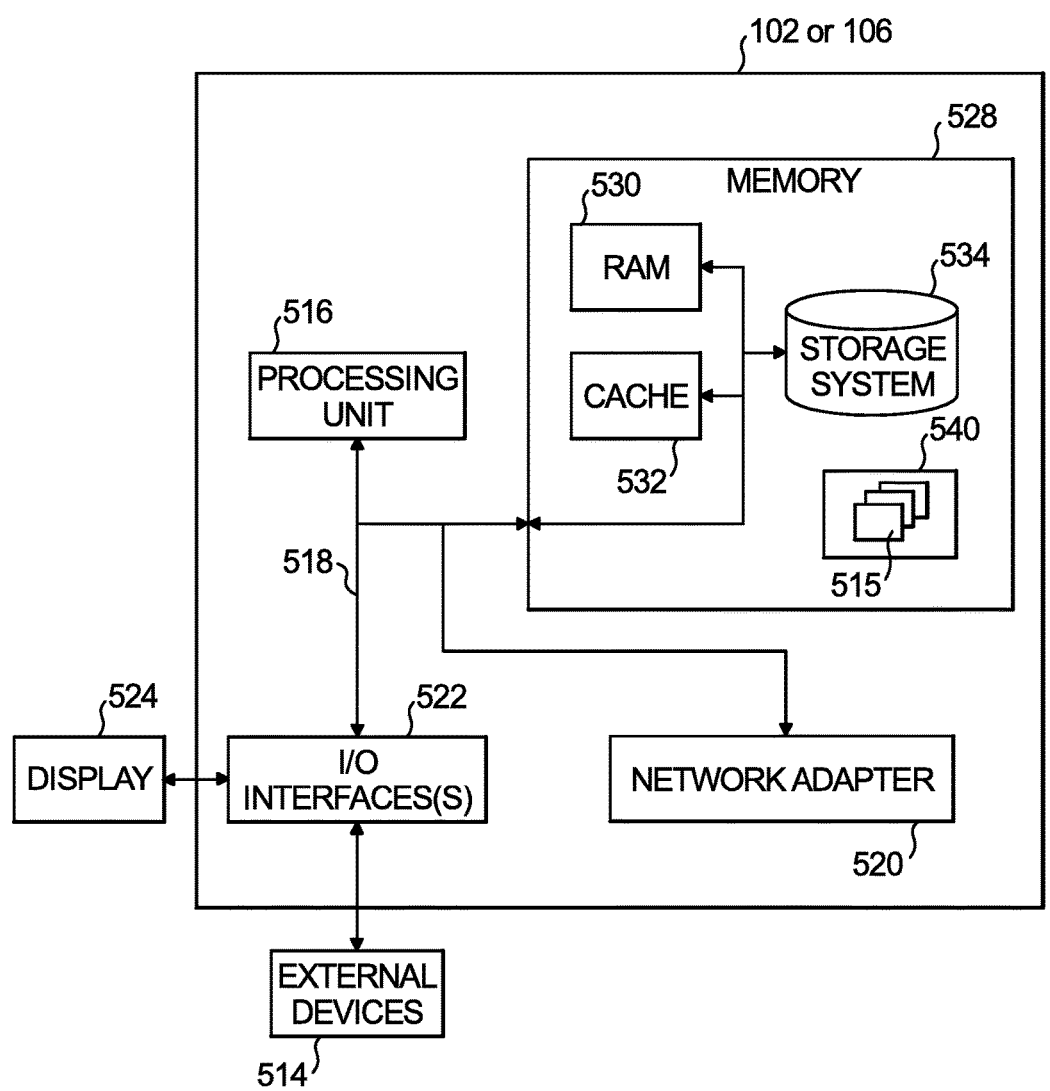
FIG. 5 illustrates an example computing system that could be used to implement a scaling module and/or a threat management device of a network protection system.

Computer system 502 is shown in FIG. 5 in the form of a general-purpose computing device. The components of computer system 502 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 502 typically includes a variety of computer system readable media. Such media may be any available media that is accessible by computer system 502, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as computer system 502, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 502 may also communicate with one or more external devices 514 such as a keyboard, a pointing device, a display 524, etc.; one or more devices that enable a user to interact with computer system 502; and/or any devices (e.g., network card, modem, etc.) that enable scaling module 102 or TMDs 106 to communicate with one or more other computing devices. Such communication can occur via Input/Output (I/O) interfaces 522. Still yet, computer system 502 can communicate with one or more networks such as a local area network (LAN), a general wide area network (WAN), and/or a public network (e.g., the Internet) via network adapter 520. As depicted, network adapter 520 communicates with the other components of network management server 104 via bus 518. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the scaling module 102 include the ability to automatically adjust a enable or disable TMDs based on the volume of threat traffic, automatically allowing unused TMDs to be available for alternate uses and further allowing for scalability of scrubbing capacity. When a TMD is added to one or more operating TMDs that are already managing the threat traffic, the newly added TMD is provided with current management state parameters of the operating TMDs. In this way, the newly added TMD does not need to accumulate its own blacklist or analyze threat traffic to determine information that is already reflected in the current state parameters, eliminating any time lag associated with such tasks. The newly added TMD can use the state parameters to recognize legitimate traffic without the need for reauthentication of traffic that was previously recognized as legitimate by the operating TMDs.

If the threat traffic volume decreases, the operating TMDs can be reduced by disabling one or more TMDs. The state parameters of the TMDs to be disabled are used to update the other operating TMDs that are not being disabled, preserving information gained by the TMDs being disabled during their operation. Additionally, statistics generated by each of the TMDs that are operating is combined, and can be displayed to a user as one graph.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to manage threats to a network with threat management computer system having a network monitor device operatively coupled to a network and a plurality of threat management devices coupled intermediate the network and a protected network, and a scaling module device operably coupled to the network monitor and the plurality of threat management devices, the method comprising:
   receiving volume threat data that indicates a volume of threat data that needs to be managed;
   determining a volume range from a plurality of volume ranges to which the received volume threat data belongs;
   determining a number of threat management devices needed to manage threat traffic associated with the volume range determined;
   selecting automatically a subset of threat management devices from the plurality of threat management devices to be used to manage received threat data in response to the determined number of threat management devices needed to manage threat traffic associated with the determined volume range;
   assigning automatically, each packet of the threat traffic to a group, each group corresponding to a threat management device of the selected threat management devices; and
   directing automatically each packet of the threat traffic to the threat management device that corresponds to the group to which the packet is assigned whereby threat traffic is prevented from reaching the protected network.

2. The method of claim 1 wherein selecting automatically the threat management device to manage received threat data includes:
   reconfiguring the threat management system to include additional threat management devices to manage threat traffic dependent upon number of threat management devices needed to manage threat traffic associated with the determined volume range; and
   reconfiguring the threat management system to include fewer threat management devices to manage threat traffic dependent upon number of threat management devices needed to manage threat traffic associated with the determined volume range.

3. The method of claim 2 wherein reconfiguring the threat management system to include additional threat management devices to manage the threat traffic includes:
   selecting, based on the number of threat management devices needed, one or more additional threat management devices of the threat management system to manage threat traffic;
   updating the number of threat management devices currently being used to include the one or more additional threat management devices;
   configuring the selected threat management devices; and
   enabling to manage threat traffic, the selected threat management devices that were configured.

4. The method of claim 3 wherein selecting the threat management devices includes efficiency balancing at least one of threat traffic and threat management tasks performed by the plurality of threat management devices.

5. The method of claim 3 wherein configuring the selected threat management devices includes copying management state parameters of threat management devices currently being used to manage the threat traffic to the selected threat management devices.

6. The method of claim 5 wherein the management state parameters associated with each of the threat management devices currently being used include at least one of a blacklist used by the threat management device for managing the threat traffic, a whitelist used by the threat management device for managing the threat traffic, authentication data used by the threat management device to authenticate the threat traffic, and statistics about the threat management performed by the threat management device.

7. The method of claim 1 wherein reconfiguring the threat management system to include fewer threat management devices to manage threat traffic includes:
   selecting, based on the number of threat management devices needed, one or more threat management devices currently being used to be disabled;
   reconfiguring threat management devices currently being used that are not selected to be disabled;
   updating the number of threat management devices currently being used to reflect the one or more threat management devices that are selected to be disabled; and
   disabling the selected threat management devices from managing threat traffic.

8. The method of claim 7 wherein reconfiguring the threat management devices currently being used that are not selected to be disabled includes copying management state parameters of the threat management devices that are selected to be disabled to the threat management devices currently being used that are not selected to be disabled.

9. The method of claim 8 wherein the management state parameters of each of the threat management devices that are selected to be disabled include at least one of a blacklist used by the threat management device for managing the threat traffic, a whitelist used by the threat management device for managing the threat traffic, authentication data used by the threat management device to authenticate the threat traffic, and statistics associated with the threat management performed by the threat management device.

10. The method of claim 1 further comprising:
receiving statistics including at least one statistical element associated with the threat management performed by each of the threat management devices used to perform threat management;
combining each statistical element across all of the threat management devices used to perform threat management; and
generating a display of the combined statistical elements, wherein the display of each combined statistical element appears to be associated with a single threat management device.

11. A computer system for managing threats to a network, comprising:
a network monitor device operatively coupled to a network;
a plurality of threat management devices coupled intermediate the network and a protected network, and operably coupled to the network monitor device;
a scaling module device operably coupled to the network monitor and the plurality of threat management devices, including a memory configured to store instructions and a processor disposed in communication with said memory, wherein said processor upon execution of the instructions is configured to:
receive volume threat data that indicates a volume of threat data that needs to be managed;
determine a volume range from a plurality of volume ranges to which the received volume threat data belongs;
determine a number of threat management devices needed to manage threat traffic associated with the volume range determined;
select automatically a subset of threat management devices from the plurality of threat management devices to be used to manage received threat data in response to the determined number of threat management devices needed to manage threat traffic associated with the determined volume range;
assign automatically, each packet of the threat traffic to a group, each group corresponding to a threat management device of the selected subset of threat management devices; and
direct automatically each packet of the threat traffic to the threat management device that corresponds to the group to which the packet is assigned whereby threat traffic is prevented from reaching the protected network.

12. The computer system of claim 11 wherein selecting automatically the threat management device to manage received threat data includes:
reconfiguring the threat management system to include additional threat management devices to manage threat traffic dependent upon number of threat management devices needed to manage threat traffic associated with the determined volume range; and
reconfiguring the threat management system to include fewer threat management devices to manage threat traffic dependent upon number of threat management devices needed to manage threat traffic associated with the determined volume range.

13. The computer system of claim 12 wherein reconfiguring the threat management system to include additional threat management devices to manage the threat traffic includes:
selecting, based on the number of threat management devices needed, one or more additional threat management devices of the threat management system to manage threat traffic;
updating the number of threat management devices currently being used to include the one or more additional threat management devices;
configuring the selected threat management devices; and
enabling to manage threat traffic, the selected threat management devices that were configured.

14. The computer system of claim 13 wherein configuring the selected threat management devices includes copying management state parameters of threat management devices currently being used to manage the threat traffic to the selected threat management devices.

15. The computer system of claim 11 wherein reconfiguring the threat management system to include fewer threat management devices to manage threat traffic includes:
selecting, based on the number of threat management devices needed, one or more threat management devices currently being used to be disabled;
reconfiguring threat management devices currently being used that are not selected to be disabled;
updating the number of threat management devices currently being used to reflect the one or more threat management devices that are selected to be disabled; and
disabling the selected threat management devices from managing threat traffic.

16. The computer system of claim 15 wherein reconfiguring the threat management devices currently being used that are not selected to be disabled includes copying management state parameters of the threat management devices that are selected to be disabled to the threat management devices currently being used that are not selected to be disabled.

17. The computer system of claim 11 wherein the processor, upon execution of the instructions, is further configured to:
receive statistics including at least one statistical element associated with the threat management performed by each of the threat management devices used to perform threat management;
combine each statistical element across all of the threat management devices used to perform threat management; and
generate a display of the combined statistical elements, wherein the display of each combined statistical element appears to be associated with a single threat management device.

* * * * *